July 4, 1967 Z. WIENCEK 3,329,768

VIDEO ENHANCING APPARATUS

Filed June 29, 1965 2 Sheets-Sheet 1

July 4, 1967 Z. WIENCEK 3,329,768

VIDEO ENHANCING APPARATUS

Filed June 29, 1965 2 Sheets-Sheet 2

United States Patent Office 3,329,768

Patented July 4, 1967

3,329,768

VIDEO ENHANCING APPARATUS

Zbigniew Wiencek, Palatine, Ill., assignor to Hazeltine Research, Inc., a corporation of Illinois Filed June 29, 1965, Ser. No. 467,969
5 Claims. (Cl. 178—5.4)

Figure 1:
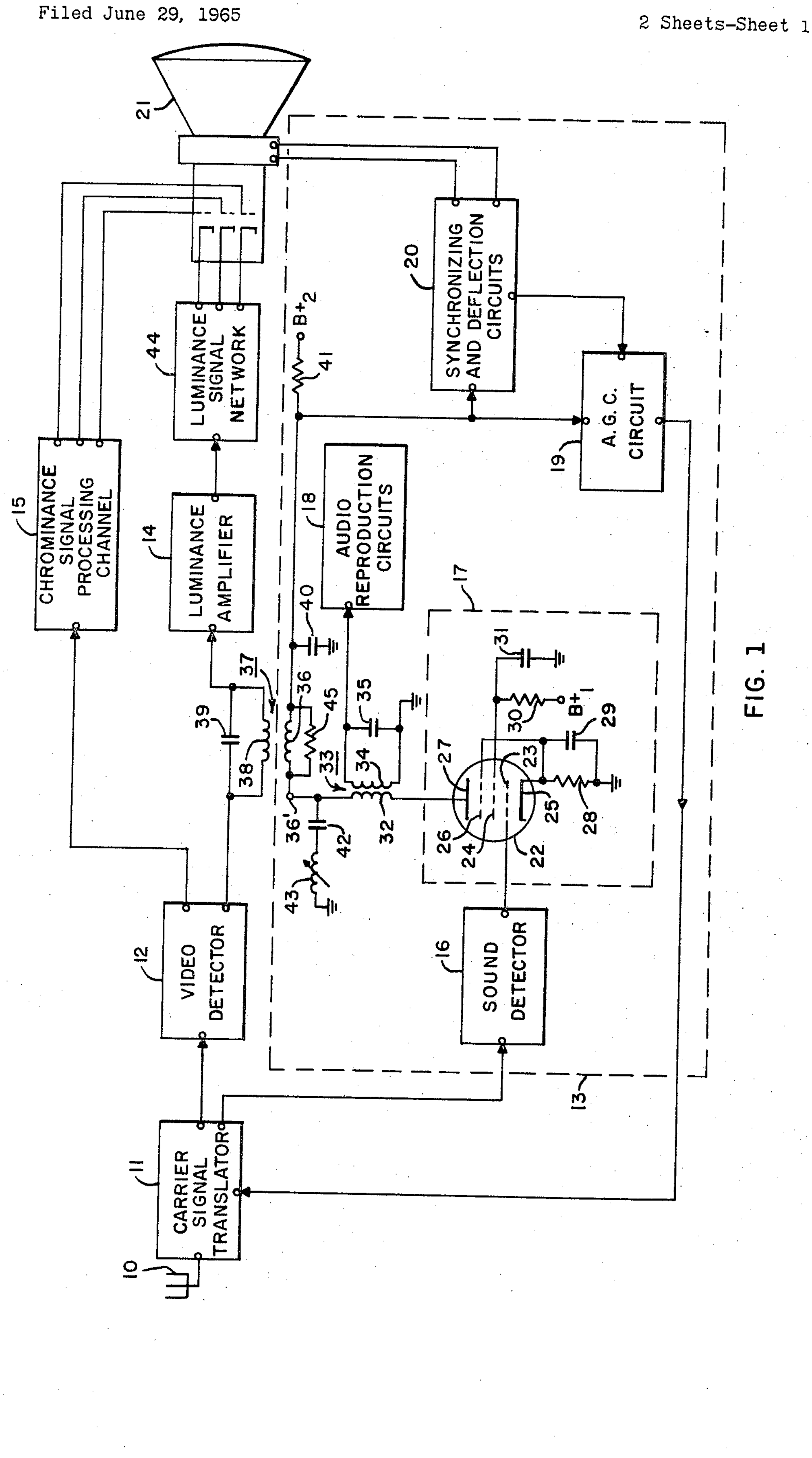

This invention relates to a signal processing apparatus and more particularly to a circuit that provides enhancement of a selected portion of the frequency spectrum of a composite video signal in a television receiver.

In present television usage, a composite transmitted video signal consists of video information having frequency components from 0–4 megacycles, synchronizing (sync) information time interleaved with the video information, sound information frequency modulated on a sound carrier spaced precisely 4.5 megacycles above the picture carrier frequency and, if it is a color program, color information modulated on a pair of 3.58 quadrature subcarriers. At the receiver, the various types of information must be detected and separated from each other to reproduce the transmitted program. In the ensuing discussion, the present invention will be described in the embodiment of a color-television receiver. However, this invention is equally applicable in a monochrome receiver.

In the conventional color receiver, the video information is detected and processed for display through the luminance channel. Ideally the bandwidth of the luminance channel would be such as to provide equal amplitude translation of the 0–4 megacycle video signal. However, as a result of the need to produce an economical receiver, the bandwidth of the luminance channel is generally limited. The high frequency components become attenuated with respect to the low frequency components. This is the result of, among other factors, the gain bandwidth limitation of the conventional luminance amplifiers and to the lesser extent, the frequency characteristics of the electron beam in the picture tube. Since the high frequency components of the video signal determine the rapidity of change of light values at the edges of objects, their attenuation is undesirable in that it causes the reproduced image to lose its sharpness. Objects tend to blend into one another rather than having well-defined outlines. The resulting image is, therefore, not particularly pleasing to the viewer. This problem tends to become more acute as still further attempts are made to reduce the number of amplification stages in the luminance channel in the interests of simplicity and economy.

Several attempts have been made to compensate for this bandwidth limitation of the receiver and still maintain an economical receiver. For instance, peaking coils are often used in a luminance amplifier to accentuate the high frequency components of the signal. This technique, however, only provides limited improvement which does not always provide sufficient compensation especially when the luminance channel is limited to a single amplifier.

It is, therefore, an object of the present invention to provide a new and improved apparatus for use in a television receiver which provides for enhancement of a selected portion of the frequency spectrum of the video signal.

It is a further object of this invention to provide a new and improved apparatus which enhances the high frequency components of the video signal without attenuating the low frequency components.

It is still a further object to provide such enhancement of the high frequency components by using existing unutilized video information signals.

For a better understanding of the present invention together with other and further objects thereof, reference is had to the following description taken in connection with the accompanying drawings, and its scope will be pointed out in the appended claims.

Referring to the drawings:

FIG. 1 is an illustration of a representative embodiment of a television receiver employing a video enhancing circuit constructed in accordance with the present invention, and FIGS. 2*a*–2*e* are illustrative waveforms useful in the description of the embodiment of FIG. 1.

*Description and operation of FIG. 1*

Referring to FIG. 1 there is shown a color-television receiver employing a video enhancement circuit constructed in accordance with the present invention. With the exception of the video enhancement circuit, which will be explained in detail below, this is a conventional color-television receiver consisting of the antenna 10, carrier signal translator 11, video detector 12, luminance amplifier 14, color signal processing channel 15, luminance signal network 44, sound detector 16, sound IF amplifier 17, audio reproduction circuits 18, AGC circuit 19, synchronizing and deflection circuits 20 and picture tube 21. The construction of the individual circuits and their means of cooperating to reproduce the transmitted information is well known and, except for the sound IF amplifier 17, will not be explained in detail.

Referring more particularly to that portion of FIG. 1 that illustrates the present invention, one output of the carrier signal translator 11 is coupled to the video signal processing channel, the luminance channel, which in the FIG. 1 embodiment consists of video detector 12 and luminance amplifier 14. This signal contains the video and synchronizing information. It will be appreciated that the luminance channel might include several stages of amplification as do many color-television receivers. However, one of the features of the present invention is that it makes the use of a single luminance amplifier practical and still provides adequate amplification over a sufficient portion of the luminance bandwidth to produce a pleasing image.

A second output terminal of the carrier signal translator 11 is coupled to the signal processing channel 13 for deriving the sound, synchronizing and AGC functions. More particularly, the output from the last IF stage of the carrier signal translator 11 is coupled to the sound detector 16 which extracts the composite video signal consisting of the 0–4 megacycle video and synchronizing information and the 4.5 megacycle sound carrier from the IF signal. The detected output is coupled to the sound IF amplifier 17.

In a conventional receiver, the composite video signal is amplified in the sound IF amplifier and the amplified 4.5 megacycle sound carrier signal is coupled to the audio reproduction circuits 18 by a tuned transformer circuit. The remaining portion of the composite video signal is generally unutilized, being dissipated in the plate load circuit of the amplifier. In some instances, a part of this signal has been used to derive the synchronizing function. The sound IF amplifier 17 of the FIG. 1 embodiment performs the same function of amplifying the composite video signal and rather than dissipating this portion of the signal spectrum, a part of it is utilized to enhance the video signal coupled to luminance amplifier 14 in accord with the teaching of the present invention. In addition, the remaining portion of the composite amplified signal is also utilized to derive the synchronizing function. The 0–4 megacycle amplified output of the sound IF amplifier readily lends itself to performing these dual functions of providing an enhancing signal for the luminance channel and a signal for deriving the synchronizing functions as sufficient synchronizing information exists in the 0–.5 megacycle portions of the spectrum to derive the synchronizing functions and generally this is the only portion of the spectrum that is utilized, while the .5–4 megacycle portion of the spectrum is ideal for the enhancing signal since this is the very portion of the spectrum that is attenuated in the luminance channel due to its bandwidth limitations. Consequently, the amplified output of the sound IF amplifier, i.e., the amplified composite video signal, can be separated into three signals occupying substantially exclusive portions of the frequency spectrum, a 4.5 megacycle signal for deriving the sound information, a .5–4 megacycle signal for providing enhancement for the video signal in the luminance channel and a 0–.5 megacycle signal for deriving the synchronizing and AGC functions.

Toward this end, the output of the sound detector 16 is coupled to the control grid 23 of vacuum tube 22 of sound IF amplifier 17. The sound detector 16 is constructed so as to supply the correct polarity signal to amplifier 17 so that the amplifier output can be directly applied to the synchronizing circuits 20 and AGC circuit 19. Vacuum tube 22 is a conventional pentode amplifier having the suppressor grid 26 connected to the cathode 25, which is coupled to ground by the parallel combination of resistor 28 and capacitor 29. The screen grid 24 is coupled to a source of positive potential $B+_1$ by resistor 30 which is bypassed to ground for RF signals by capacitor 31. The plate 27 of pentode tube 21 is coupled to a source of positive potential, $B+_2$, by way of winding 32 of transformer 33, winding 36 of transformer 37 and resistor 41. An amplified composite video signal, including the video, synchronizing and sound information therefore exists at the plate 27 of pentode 22.

The plate 27 of amplifier tube 22 is coupled to a means for separating the amplified composite video signal into a plurality of component signals; which include transformers 33 and 37. More particularly, the plate 27 is coupled to the primary winding 32 of transformer 33. The effective inductance of winding 32 is such as to present a high impedance transmission path to the 4.5 megacycle sound carrier and a low impedance transmission path to the remaining frequency components of the amplified composite video signal. The sound carrier developed across winding 33 is inductively coupled to winding 34 of transformer 33 which is tuned to the 4.5 megacycle sound carrier frequency by capacitor 35. The sound information is then coupled to the audio reproduction circuits 18 where the sound information is reproduced in the conventional manner. Capacitor 42 and variable inductor 43 comprise a conventional sound trap which further aids to separate the amplified signal into component signals. The series resonant sound trap provides a low impedance path to ground for the 4.5 megacycle sound carrier frequency and a relatively high impedance for the other frequency components of the composite video signal. Therefore, the 4.5 megacycle sound carrier is substantially eliminated from the video signal coupled to the input terminal 36' of transformer 37.

Figure 2A:
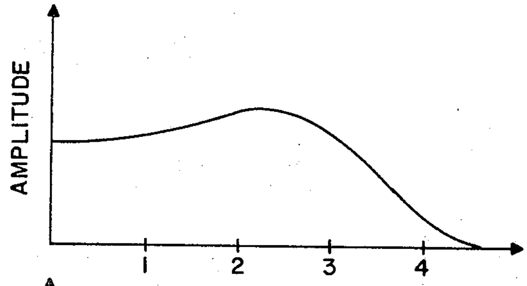
Figure 2B:
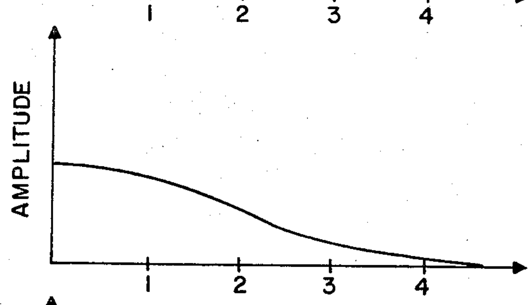
Figure 2C:
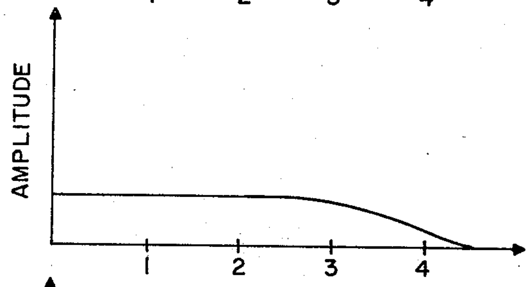
Figure 2D:
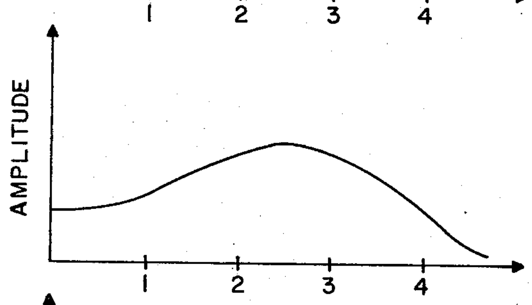
Figure 2E:
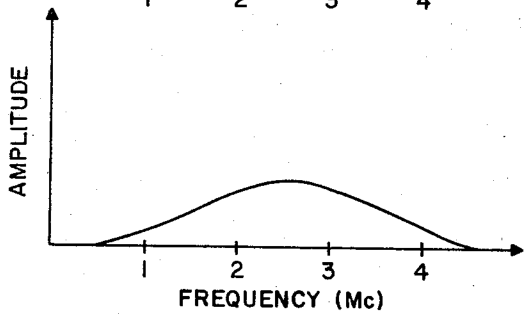

The primary winding 32 of transformer 33 is coupled to the synchronizing circuits 20 and the AGC circuit 19 by means of the primary winding 36 of transformer 37, which provides a low impedance transmission path for the lower portion of the frequency spectrum of the composite video signal. That portion of the frequency spectrum of the composite video signal extending from zero to approximately half a megacycle is therefore coupled, substantially unattenuated, by winding 36 to the synchronizing and deflection circuits 20 and AGC circuit 19 where the signal is utilized in a conventional manner. The effective inductance of winding 36 provides a high impedance transmission path for the upper portion of the frequency spectrum of the 0–4 megacycle signal. Capacitor 40 provides a low impedance path to ground for this upper portion of the spectrum so that the major part of the upper portion of the frequency spectrum is developed across winding 36. This signal is inductively coupled to the luminance channel by transformer 37, the secondary winding of which is resonated by capacitor 39 at the proper frequency. Resistor 45 is coupled across winding 36 of transformer 37 to broaden the bandwidth of the enhancing signal coupled to the secondary winding 38. The signal inductively coupled to winding 38 of transformer 37 is combined with the video signal directly coupled from the video detector 12 to produce a video information signal which has accentuated high frequency components. In order to provide that the signals are combined in an additive manner and to avoid phase distortions in the enhanced video signal, the enhancing signal inductively coupled from the sound IF amplifier must be in phase with the video signal coupled from the video detector 12 to winding 38. In the embodiment of FIG. 1, transformer 37 provides a phase shift of such magnitude and polarity to compensate for the phase displacement, with respect to the phase of the signal coupled to the luminance amplifier 14 from detector 12, created by carrier signal translator 11, sound detector 16 and sound IF amplifier 17. The portion of the frequency spectrum chosen to be coupled to the luminance channel from signal processing channel 13 is dependent on the bandwidth limitation of the particular receiver. For a given receiver, for instance, it might be necessary to couple a signal having characteristics similar to those shown in FIG. 2*a*, to the cathodes of picture tube 21 to obtain a pleasing image therein. A signal as illustrated in FIG. 2*a* will provide some overshoot at the edges of objects to provide a sharper image and also provide compensation for the possible limitations of the picture tube itself. In the same receiver, the luminance amplifier 14 might typically have a frequency versus amplitude characteristics as shown in FIG. 2*b*. Assuming the output of the video detector 12 has a substantially flat frequency versus amplitude characteristic over the range of 0–4 megacycles as shown in FIG. 2*c*, in order to obtain a signal having frequency versus amplitude characteristic as shown in FIG. 2*a* at the cathodes of the picture tube 21, the input to the video amplifier must have a characteristic similar to that shown in FIG. 2*d*. To achieve this result, the signal coupled by transformer 37 from the sound IF amplifier 17 must have a frequency versus amplitude characteristic similar to that shown in FIG. 2*e*. The portion of the frequency spectrum coupled by transformer 37 to the luminance channel is determined by its frequency characteristics and the choice of capacitors 39 and 40. The amplitude of the enhancing signal is primarily determined by the amount of inductive coupling between windings 36 and 38 and the choice of capacitor 40.

While applicant does not wish to be limited to any particular set of circuit constants, the following have proved useful in a video enhancing apparatus as represented in FIG. 1.

| | |
|---|---|
| Pentode 22 | 6EW6. |
| Resistor 28 | 22 ohms. |
| Capacitor 29 | 0.01 microfarad. |
| Resistor 30 | 18 kilohms. |
| Capacitor 31 | 0.1 microfarad. |
| Transformer 33 | conventional 4.5 megacycle transformer. |
| Capacitor 35 | 20 picofarads. |
| Transformer 37 | No. 38 wire. |
| Primary | 70 turns. |
| Secondary | 50 turns. |
| Capacitor 39 | 180 picofarads. |
| Capacitor 40 | 68 picofarads. |
| Resistor 41 | 22 kilohms. |
| Capacitor 42 | 15 picofarads. |
| Variable Inductor 43 | Approximately 80 microhenries, adjustable ±20 microhenries. |

| | |
|---|---|
| $B+_1$ | 140 v. D.C. |
| $B+_2$ | 270 v. D.C. |
| Resistor **45** | 1.5 kilohms. |

The embodiment of FIG. 1 is truly only a representative embodiment of the present invention. It is not essential to the present invention that the enhancing signal for the luminance amplifier (or corresponding video amplifier in a black-and-white receiver) be derived from the sound IF amplifier. The important factor is that the capability for amplifying the video signals and in many cases the amplified video signal, itself, which exists in many receivers, but at present is unutilized, is used to enhance the video information signal in the luminance channel to compensate for the bandwidth limitation of the ordinary television receiver. In other words, an amplifier that is presently used to amplify only a portion of the composite video signal is modified to amplify the entire composite video signal and the amplified output is separated into component signals occupying substantially exclusive portions of the frequency spectrum. One of said component signals performs the intended function of the amplifier and another of said signals is used to enhance the video signal in the luminance channel.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In a television receiver responsive to a composite video signal which contains video information and additional information required for the reproduction of the entire transmitted program, a video enhancing circuit comprising:

a first signal processing channel responsive to the composite video signal for processing said video information for display;

a second signal processing channel, including an amplifier means responsive to the composite video signal and means for separating the amplified composite signal into a plurality of component signals having substantially exclusive frequency spectrums, for producing a first component signal for enhancing the video signal in said first channel and a second component signal containing additional information required for the reproduction of the transmitted program;

and means for combining said first component signal from said second channel with the video information in said first channel to provide an enhanced video information signal.

2. A video enhancing circuit as specified in claim 1 in which the means for combining the first component signal from the second signal processing channel with the video information signal and the first signal processing channel combines them additively, substantially in phase, to provide an enhanced video information signal.

3. In a color-television receiver responsive to a composite video signal which contains video, sound and synchronizing information, a video enhancing circuit comprising:

a first signal processing channel responsive to the composite video signal for processing said video information for display;

a second signal processing channel including an amplifier means responsive to said composite video signal, means for separating the amplified composite video signal into first, second and third component signals consisting primarily of the upper, mid and lower portions respectively of the frequency spectrum of the amplified composite signal, means responsive to said first component signal for deriving sound information therefrom and means responsive to said third component signal for deriving synchronizing functions therefrom;

and third means for combining said second component signal with the video information signal in said first signal processing channel.

4. A video enhancing circuit as specified in claim 3 in which the means for separating comprises a first means for providing a high impedance for the sound carrier signal and a low impedance for the remaining portion of the frequency spectrum of the amplified composite video signal and second means, coupled to said first means, for providing a high impedance for the upper portion of the frequency spectrum of the amplified composite video signal and the low impedance for the lower portion of the frequency spectrum of said signal, and in which the upper portion of the frequency spectrum is coupled to said luminance channel and combined, in phase, with the video signal in said luminance channel to provide an enhanced video information signal in which the high frequency components are accentuated with respect to the low frequency components.

5. In a television receiver responsive to a composite video signal which contains video, sound and synchronizing information, a video signal enhancing circuit comprising:

a signal translating means having a first output for providing a video and synchronizing signal and a second output for providing a composite video signal;

a luminance channel, coupled to the first output of said signal translating means, including a first amplifier for amplifying said video and synchronizing signal;

a second amplifier coupled to the second output of said signal translating means for amplifying said composite video signal;

a first transformer circuit, having the primary winding coupled to the output of said second amplifier, said transformer circuit tuned to couple the amplified sound carrier to the secondary winding and to present a low impedance to the video and synchronizing signal through said primary winding;

means, coupled to the secondary winding of said first transformer, for reproducing the sound information;

a second transformer circuit having the primary winding connected to the output of said second amplifier by way of the primary winding of said first transformer circuit and the secondary winding coupling the video signal supplied by the first output of said signal translating means to said first amplifier, said second transformer tuned to provide a low impedance through said primary winding to the lower portion of the frequency spectrum of the signal amplified by said second amplifier and to couple the upper portion of the spectrum of said signal to the secondary winding for combining that portion of the signal, in phase, with the video signal from the first output of the signal translating means to provide an enhanced video signal;

and means coupled to the primary winding of said second transformer for deriving the synchronizing functions.

References Cited

UNITED STATES PATENTS

| | | | |
|---|---|---|---|
| 2,770,673 | 11/1956 | Creamer | 178—5.4 |
| 2,944,106 | 7/1960 | Schroeder et al. | 178—5.4 |
| 3,153,207 | 10/1964 | Brown | 178—7.5 |
| 3,167,611 | 1/1965 | St. John | 178—5.4 |

JOHN W. CALDWELL, *Acting Primary Examiner.*

J. A. O'BRIEN, *Assistant Examiner.*